2,824,805

PROCESS OF TREATING COFFEE

William J. Hale, Midland, Mich., assignor to Verduria Company, Detroit, Mich., a corporation of Michigan No Drawing. Application August 15, 1952
Serial No. 304,650

5 Claims. (Cl. 99—68)

This invention relates to a process of treating coffee and to a roasted coffee product of improved quality and is a continuation-in-part of Ser. No. 303,843, filed August 11, 1952.

Broadly considered, the invention comprehends the concept of roasting coffee in the presence of or in contact with a non-toxic porphyrin type compound which has a selective, beneficial action on certain undesirable components of the coffee bean to thereby produce a product of enhanced quality.

In the plant world the catalyst chlorophyll exists in two well defined forms, chlorophyll-a ($C_{55}H_{72}O_5N_4Mg$) and chlorophyll-b ($C_{55}H_{70}O_6N_4Mg$) in the ratio of about 3 to 1 respectively. The former readily undergoes oxidation into the latter in the presence of air and the latter readily undergoes reduction into the former through the agency of carotenes and similar deoxidants always present wherever chlorophyll is present. In the presence of sunlight the coordinated function of chlorophylls and carotenes suffices to reduce carbonic acid of the atmosphere into the vast array of organic compounds on earth.

Of particular note is the presence of a trace of chlorophyll in the green coffee bean. Though the bean will ripen when left to itself, it has the property of developing a most pleasant aroma when roasted before the green berry has turned brown, and to such extent that a beverage made from the roasted bean is highly palatable. Of course, the quantity of chlorophyll in the roasted coffee bean is practically nil. No chlorophyll could withstand 400° F. roasting. But in the green bean there is present usually about 1/500 of 1% of chlorophyll. Undoubtedly even this exceedingly small content of chlorophyll will play its role as oxidative catalyst increasingly with rise in temperature, or up to point of its decomposition. On this basis it has now been determined that chlorophyll may play a beneficial role in destroying small portions of chlorogenic acid and trigonelline, two of the undesirable factors always present in coffee. At the same time chlorophyll appears to be incapable of destroying the caffeine content of coffee. These facts, as will be appreciated, make possible the producing of an improved beverage.

As is known to those skilled in the art, the degree and duration of roasting coffee beans have much to do with final composition of roasted bean. Where over-roasting is carried on there is found to be present somewhat less trigonelline under the normal content of approximately 1 percent of same in ordinary roasted coffee. So, likewise, the content of chlorogenic acid in highly roasted coffee is no more than 75% of the usual 4 to 5 percent of same in ordinary roasted coffee. In all cases the caffeine content of about 1 percent by weight remains constant for lightly roasted or highly roasted coffee so long as there has occurred no burning that leads to its destruction.

It is now found that the impregnation of green coffee beans with an additional quantity of chlorophyll amply suffices for a more extensive catalytic oxidation of the contents of the bean without materially affecting the content of the caffeine, so desirable as stimulating factor in coffee beverages. In particular we note that the deleterious trigonelline and chlorogenic acid are markedly reduced in percentage content. Furthermore, as may well have been inferred, the additional oxygenative action serves well to couple butyl, furfuryl and other mercaptans into the polysulphide stage—or that stage definitely contributive to coffee aroma. So marked is this that if sufficient chlorophyll can be evenly distributed within the green bean, the oxidative processes accompanying roasting can be carried out in shorter time and oftentimes at lower temperatures; all of which makes possible a less toxic coffee beverage and yet one with an enhanced aroma. Naturally, too long a roasting with or without chlorophyll will destroy all aroma; hence 5 to 10 minutes' roasting is the general practice.

The term chlorophyll, as herein employed, comprehends a class of non-toxic compounds comprising a structure of four pyrrole rings (through their alpha carbon atoms) and four methine groups linked alternately into a 16-member carbon-nitrogen ring known as porphin, wherein derivatives of such, known as porphyrins, comprising the naturally occurring haeme and chlorophyll, are primarily concerned in this study. The haeme derivatives carry a metallo-complex of iron; whereas the chlorophyll derivatives carry a metallo-complex of magnesium. Furthermore, many of these compounds, as haeme and ordinary chlorophyll, are insoluble in water. In the purview of this invention, preferably soluble or solubilized forms of these porphyrin compounds are employed. This, by reason of the fact that as deep a penetration of the green bean must be effectuated if we would attain the highest degree of reaction within the bean upon roasting.

In the case of chlorophyll there is readily securable a water-soluble form simply by hydrolyzing away the phytyl group to yield a type of compound known as a chlorophyllide; a little further hydrolysis eliminates the methyl group attached to the remaining carbomethoxyl such that the end-product is no longer an ester but a free acid usually in the form of an alkali salt; this product is known as a chlorophyllin. Both chlorophyllide and chlorophyllin are equally as reactive toward oxygen as is the insoluble chlorophyll. Indeed the magnesium-complex of all of these compounds can also be removed by acid treatment whereupon the resulting pheophorbins and pheophytins respectively come to hand. They too are equally as reactive toward oxygen as is chlorophyll.

Basically this invention comprehends only the employment of such porphyrins as are capable of taking up and giving off oxygen to the surrounding media, notably here the coffee bean itself; and primarily this invention comprehends the diffusion throughout the to-be-roasted product of considerably more of these oxidative agents than are normally to be found in said bean or product to be roasted, or what is taken at no less than 1/500 of 1 percent.

In carrying out the invention, porphyrin derivatives were introduced into green coffee beans as well also as in roasted coffee beans. Analytical results indicated a considerable decomposition of only the more readily oxidizable components, such as chlorogenic acid (inclusive of its constituent parts, caffeic and quinic acids) and trigonelline, but not appreciatively of caffeine and the polysulphides. The result is the enhancement of the final product for beverages in all cases where the green beans were treated, but in the case of roasted beans only when roasting had been scarcely started.

The coffee bean selected was that of Brazilian type, known as $AP_1$, analyzing in green state for 0.96 percent caffeine; 5.60 percent chlorogenic acid; and 1.20 percent trigonelline.

There was reported in the earlier application, above cited, the effect of adding minor amounts of non-toxic wetting agents, particularly non-toxic quaternary amino compounds to aqueous solutions of water soluble chlorophyll in an amount of the order of 0.1% more or less of the quaternary compound in the aqueous solution serves very effectively to carry the chlorophyll solution into the interior of the whole or cracked coffee bean and to homogeneously distribute the chlorophyll therethrough. The use of such wetting agents insures a high degree of penetration of the active chlorophyll into the interior of the coffee and insures a more complete and uniform lessening in the content of chlorogenic acid and trigonelline when the impregnated coffee is subsequently roasted. The quaternary ammonium compound employed may be one which possesses a desirable lipophile-hydrophile balance as well as bacteriostatic properties to thereby insure powerful interface modifying properties as well as bacteriostatic activity. A typical, although not exclusive, example of such a wetting agent is "Emulsept" which is an N(higher acyl ester of colomino formyl-methyl) pyridium chloride.

The employment of 0.045 gram of chlorophyllin to 1 pound of green coffee bean is equivalent to 1/100 of 1 percent chlorophyll content in bean to be roasted. This is more than 5 times the quantity of chlorophyll generally present as maximum in green coffee beans.

It is now found that yet another type of wetting agent plays a two-fold role. Such wetting agents are the sulfonic or sulfuric derivatives of long chain fatty acids already esterified by amino alcohols. A typical, although not exclusive, example of such a wetting agent is "Sulfocolaurate" of the following chemical structure: lauric acid ester of the potassium salt of sulfoacetic acid amidified with β-amino ethyl alcohol

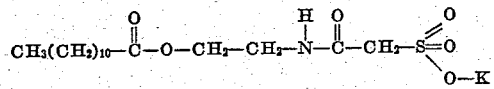

Now the initial role of a sulfonate of the type above is one to carry the porphyrin, i. e., chlorophyll, reductive-oxidative agent into the innermost interstices of coffee bean; in which capacity these alkyl sulfonates are particularly efficient. The secondary role of a sulfonate of the type above is to suffer marked reduction by the action of chlorophyll or other porphyrins, such as haeme, as well as by various enzymes ordinarily present in the coffee bean and become itself converted into a sulfide and further to be coupled into other sulfides and polysulfides known to confer the specific "coffee aroma" upon coffee beverage. The result is definitely an enhanced coffee aroma, arising, as is well known, from alkyl and aromatic polysulfides; among these latter normal butyl and furfuryl sulfide are outstanding.

Yet another specific form of sulfonate here to be mentioned is the newly announced "Emcol 4150" comprising chiefly a sulfonated oleic acid amide of the following structure:

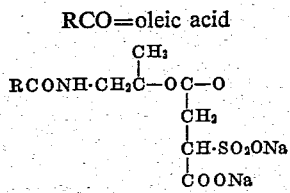

The recommended amount of such sulfonates to be employed in treatment of coffee beans may well be of the order of the weight of porphyrin used, frequently even of two to three times the amount of porphyrin used. But at all times the employed solutions should be maintained close to neutrality.

The eminent utility of this invention will be appreciated from a consideration of several examples:

Example 1

To one pound (450 grams) of green Brazilian coffee bean gently dried to a constant moisture content of 5 to 8 percent (from original 15-17 percent) there was added 50 cc. of an aqueous solution containing 0.7 gram potassium magnesium chlorophyllin. The beans are hereby thoroughly wetted. After standing for 6 to 8 hours to air dryness, the beans were roasted for 8 to 10 minutes in the course of bringing the roasting temperature just to 400-410° F. whereupon the beans were quenched in the usual manner and ground. By analysis the roasted beans carried 1.00 percent caffeine, 3.5 percent chlorogenic acid and 0.6 percent trigonelline, as over against this same Brazilian bean known as $AP_1$ and analyzing in the original green state for 1.00 percent caffeine, 5.6 percent chlorogenic acid and 1.2 percent trigonelline.

Example 2

Example 1 was repeated save here an equivalent quantity of haemoglobin (0.8 gram) was substituted for the chlorophyllin. The analytical results were practically identical with those of Example 1, although the trigonelline content was not below 0.8.

Example 3

Example 1 was now repeated with the addition of 0.7 gram "Sulfocolaurate" to the potassium magnesium chlorophyllin solution. The analytical results indicated a content of 1.00 percent caffeine, 3.3 percent chlorogenic acid and 0.3 percent trigonelline.

Example 4

Example 1 was again repeated with the addition of 1.0 gram of "Emcol 4150" to the chlorophyllin solution. Analytical results were practically identical with those of Example 3. Closely comparable results were likewise obtained by repeating Example 2 in the application of sulfonates as in Examples 3 and 4.

Both in Example 3 and in Example 4 the aroma of the brewed beverage of coffee exhibited marked enhancement of richness of flavor and lack of bitterness over a beverage brewed from the roasted original or unchlorophyllized coffee bean. The lack of bitterness was due, of course, to a lessening in content of the bitter trigonelline.

Likewise, it is found advantageous at time to accept small quantities of the generally accompanying carotenes with the chlorophyll employed. The carotenes aid in the stabilizing of the chlorophyll itself, especially valuable in the initial stage or heating-up of the coffee beans, as well as in promoting the oxidation steps.

While a preferred modification of the invention has been described, it is to be understood that this is given to illustrate the underlying principle of the invention and not as limiting the useful scope of the invention to the particular chosen embodiment.

I claim:

1. A method of preparing coffee having a decreased amount of chlorogenic acid and trigonelline which comprises: impregnating green coffee with an aqueous solution of a non-toxic oxygen-carrying porphyrin containing a non-toxic sulfonated amino-alcohol amidified long chain fatty acid, and, roasting the coffee up to a temperature of not substantially in excess of 400 degrees Fahrenheit for a period of time sufficient to destroy a substantial portion of the chlorogenic acid and trigonelline ordinarily present in green coffee beans.

2. A method of preparing coffee having a decreased amount of chlorogenic acid and trigonelline which comprises: impregnating green coffee with an aqueous solution of a non-toxic oxygen-carrying porphyrin and a lauric acid ester of the potassium salt of sulfoacetic acid amidified with β-amino ethyl alcohol and, roasting the coffee up to a temperature of not substantially in excess of 400 degrees Fahrenheit for a period of time sufficient to destroy a substantial portion of the chlorogenic acid and trigonelline ordinarily present in green coffee beans.

3. The process of claim 2 in which the oxygen-carrying porphyrin is a water-soluble chlorophyll.

4. A method of preparing coffee having a decreased amount of chlorogenic acid and trigonelline which comprises: impregnating green coffee with an aqueous solution of a non-toxic oxygen-carrying porphyrin containing a wetting agent having the formula:

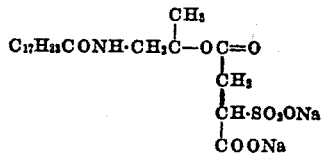

and, roasting the coffee up to a temperature of not substantially in excess of 400 degrees Fahrenheit for a period of time sufficient to destroy a substantial portion of the chlorogenic acid and trigonelline ordinarily present in green coffee beans.

5. The process of claim 4 in which the oxygen-carrying porphyrin is a water-soluble chlorophyll.

References Cited in the file of this patent

UNITED STATES PATENTS

| | | |
|---|---|---|
| 1,822,227 | Lendrich et al. | Sept. 8, 1931 |
| 2,119,329 | Heuser | May 31, 1938 |
| 2,198,207 | Musher | Apr. 23, 1940 |
| 2,341,723 | Kennedy | Feb. 15, 1944 |
| 2,513,002 | Chenicek | June 27, 1950 |
| 2,607,689 | Hale | Aug. 19, 1952 |